United States Patent [19]
Ishii

[11] Patent Number: 5,918,575
[45] Date of Patent: Jul. 6, 1999

[54] PROCESSING METHOD FOR A CONNECTING ROD

[75] Inventor: Yoshikazu Ishii, Toyota, Japan

[73] Assignee: Toyota Jidosha Kabushiki Kaisha, Toyota, Japan

[21] Appl. No.: 08/744,966

[22] Filed: Nov. 7, 1996

[30] Foreign Application Priority Data

Nov. 8, 1995 [JP] Japan .................................... 7-314739

[51] Int. Cl.⁶ .................................................... F02B 75/32
[52] U.S. Cl. ..................................... 123/197.3; 29/888.09
[58] Field of Search ........................ 29/888.09, 888.091, 29/888.092, 558; 123/197.3

[56] References Cited

U.S. PATENT DOCUMENTS

| | | | |
|---|---|---|---|
| 1,847,742 | 3/1932 | Anderson | 29/888.09 |
| 2,031,173 | 4/1936 | Miller . | |
| 2,502,737 | 4/1950 | Meley et al. | 29/888.092 |
| 2,533,822 | 12/1950 | Lee et al. | 29/888.09 |
| 3,932,053 | 1/1976 | Hack | 29/558 |
| 4,191,238 | 3/1980 | Pichl | 29/888.09 |
| 5,353,500 | 10/1994 | Hoag et al. | 29/888.091 |
| 5,544,413 | 8/1996 | Stevens et al. | 29/558 |

FOREIGN PATENT DOCUMENTS

| | | | |
|---|---|---|---|
| 300098 | 9/1954 | Switzerland . | |
| 1682657 | 10/1991 | U.S.S.R. | 29/888.09 |

*Primary Examiner*—Erick R. Solis
*Attorney, Agent, or Firm*—Cushman Darby & Cushman IP Group of Pillsbury Madison & Sutro LLP

[57] ABSTRACT

A method of manufacturing a connecting rod for a piston engine in which the inner surface of the small hole of the connecting rod is milled to produce a multifaceted surface which includes two deep spot faces along each edge of the small hole and two tapered faces. This milling step yields thin edge regions along each edge of the small hole to serve as a process reference hole with process reference planes. The final step, according to the method of this invention, is to remove the thin edge regions with a rotating cutting tool, thus exposing the tapered faces to serve as chamfered edges without any significant production of burs or distortion of the connecting rod.

12 Claims, 18 Drawing Sheets

PROCESSING METHOD FOR A CONNECTING ROD

BACKGROUND OF THE INVENTION

1. Field of the Invention

The present invention pertains to a method of manufacturing engine parts, and more particularly to a method of finishing a connecting rod of a piston engine.

2. Description of the Related Art

Connecting rods for piston engines, such as the internal combustion engine of an automobile, transfer power from the pistons to the crank shaft. Typically manufacturers of connecting rods first form the rough shape of the connecting rod by either forging or casting methods. They must then machine the rough connecting rods to obtain the finished product. The specific method of machining the rough connecting rod to obtain the finished product can greatly affect the cost and quality of the finished connecting rod.

A connecting rod generally has a small hole at one end and a large hole at the opposing end. (For example, see FIGS. 1 and 2.) FIGS. 3A–8 provide an illustration of prior art methods of finishing connecting rods. Typically, the first step in finishing the small-hole end is to apply a milling process to the inner surface of the small hole such that it conforms to the desired tolerances. The bold lines in FIG. 3A represent this first step. In the second step, one chamfers the edge as indicated by bolds lines in FIG. 3B. In the third step, one mills the inner surface of the small hole a second time to remove burs that the chamfering step generated, thus allowing the small hole to be used as a reference hole (see FIG. 4). In the fourth step, one cuts the workpiece along parallel planes such that they may serve as reference planes. The bold lines in FIG. 5 represent the cross-sectional view of these parallel plane surfaces. Next, one uses the reference surface and reference planes of the small hole to simultaneously process both the small and large hole to satisfy combined tolerances. This is indicated schematically by bold lines in FIG. 6. In this last step, one processes surfaces of the large hole (see FIG. 1) such that they coincide with the reference planes.

If one can process the connecting rod such that the width at the small-hole end ($B_1$ in FIG. 2) is smaller than the width at the large-hole end ($B_2$ in FIG. 2), one can obtain additional design flexibility and other advantages such as weight reduction. To achieve this, many of the prior methods involved cutting the parallel planes deeper than that of the fourth step as indicated in bold lines in FIGS. 7A and 7B. One would then follow this cutting step by a chamfering step.

There are several problems and limitations of such prior art methods of producing connecting rods. Typically, one cannot maintain a steady production flow of connecting rods of both the type in which $B_1$ is equal to $B_2$, and the type in which $B_1$ is less than $B_2$. In addition, the chamfering step leads to the formation of burs, as one can see illustrated in FIG. 8. Finally, the cutting action imposes stresses on the connecting rod that tend to distort the small-hole region from the desired specifications. This puts limitations on how small one can make $B_1$.

SUMMARY OF THE INVENTION

Accordingly, one object of this invention is to provide a method for producing connecting rods for piston engines such that a steady production line flow can be maintained when connecting rods with $B_1$ equal to $B_2$ and $B_1$ less than $B_2$ are produced on the same production line.

Another object of this invention is to provide a method for producing connecting rods for piston engines with $B_1$ less then $B_2$ such that chamfering does not produce burs.

Another object of this invention is to provide a method for producing connecting rods for piston engines with $B_1$ less then $B_2$ without producing any significant stresses which tend to distort the small-hole region of the connecting rods.

Still another object of this invention is to provide connecting rods produced by the above-described methods, including connecting rods made with the methods of this invention to specifications that are unavailable according to prior production-line methods.

The above and related objects of the instant invention are realized by a manufacturing method which includes a step whereby a special milling tool is used to mill the inner surface of the small hole of a connecting rod. The special milling tool produces a multifaceted inner surface of the small hole such that the hole has a larger radius for a small region proximate to each end of the small hole than that of the central region of the hole. This specification refers to the large radius regions as "deep spot" facings. The special milling tool also produces a diagonal surface region between each deep spot face and the small radius central region. The diagonal surface regions have an angle typical of chamfered surfaces. This specification refers to these diagonal surface regions as "tapered edges."

Additional machining steps can be conducted using the small hole as a reference hole and using reference planes. As a final step, one removes the material which forms the deep spot face using a rotating cutting tool. This specification refers to this material as the "thin edges." The rotating cutting tool rotates about an axis which coincides with the central axis of the small hole and shaves off layers of material. This method of removing the thin edge of material which forms the deep spot face has advantages that it produces minimal distorting stresses on the small hole region and it produces almost no burs. In this way, the diagonal surfaces become the surface regions which prior art methods produce by chamfering.

One advantage of the method of manufacture according to this invention is that it can be used to produce commercially useful connecting rods which are unavailable using previously known production line methods. Since the final step of removing the thin edge with the rotating cutting tool produces minimal distorting stresses on the small hole region, the width $B_1$ (see FIG. 2) can be made smaller than with the conventional methods without resulting in unacceptable distortions.

DETAILED DESCRIPTION OF THE PREFERRED EMBODIMENTS

Figure 1:
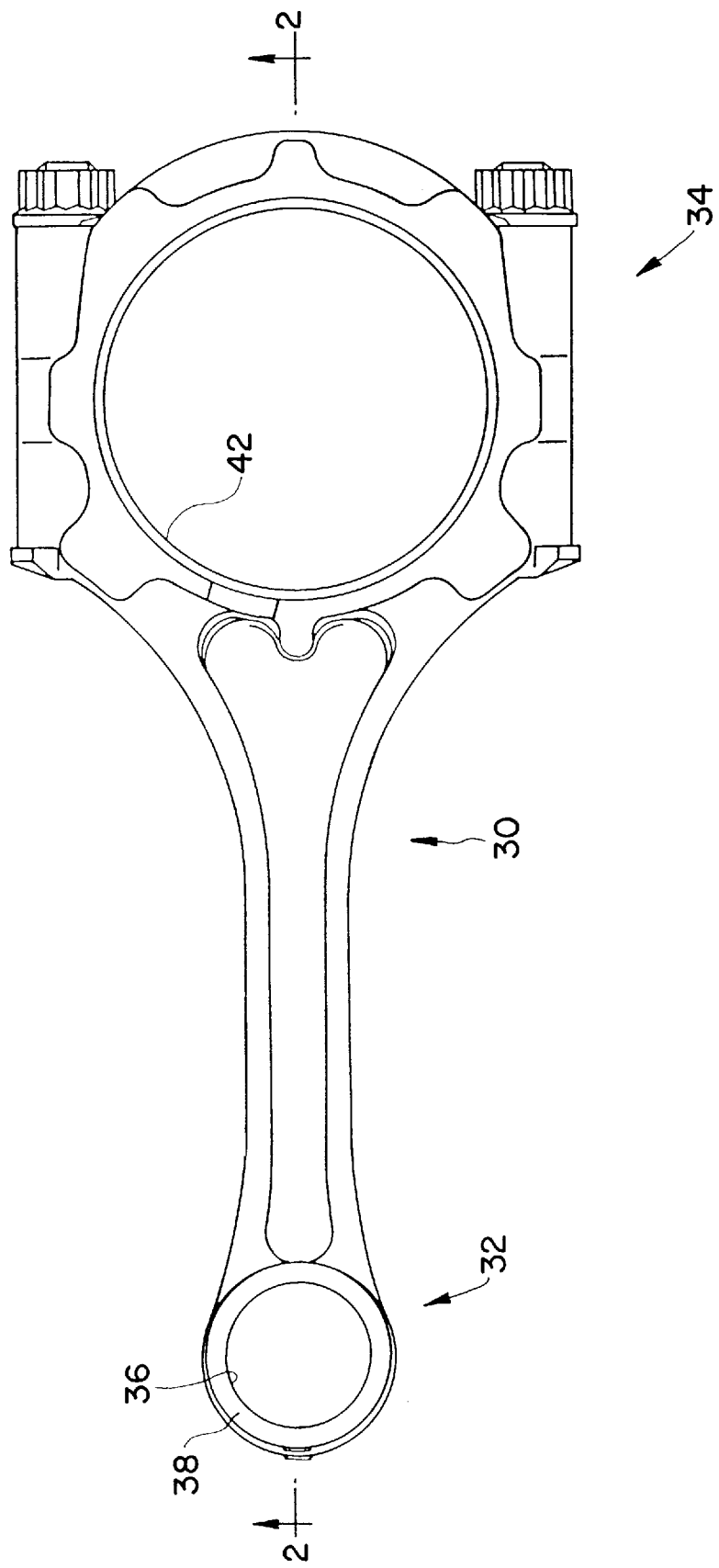
FIG. 1 is a front view of the connecting rod made according to the preferred embodiment of the invention.

Presented below is a detailed description of the method of producing connecting rods for piston engines according to the present invention, and connecting rods produced by this method, with reference to the figures. FIG. 1 provides a general illustration of a connecting rod, designated generally by reference numeral 30, which could have been produced according to the method of this invention or according to other methods. The connecting rod 30 has a small hole end 32 and a large hole end 34. The small hole end 32 has an inner surface region 36 and tapered faces 38 and 40, which one may better view in FIG. 2. (Prior art methods produced tapered faces 38 and 40 by chamfering the edges of the small hole end 32.) The large hole end 34 also has an inner surface 42.

Figure 2:
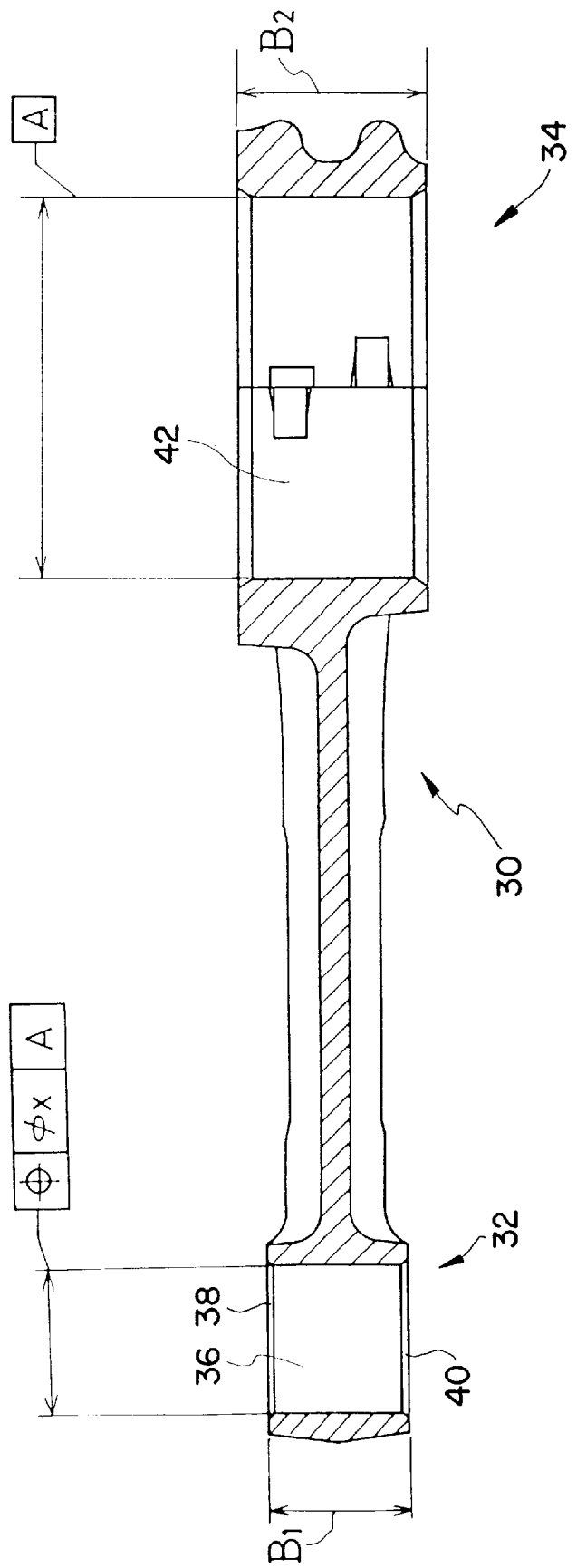
FIG. 2 is a sectional view taken on section line 2—2 in FIG. 1.
Figure 3A:
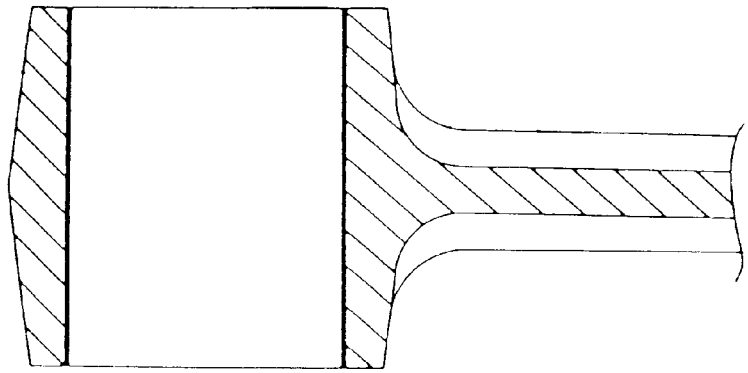
FIG. 3A shows the first step in conventional processing of a connecting rod, wherein the small diameter hole is milled.
Figure 3B:
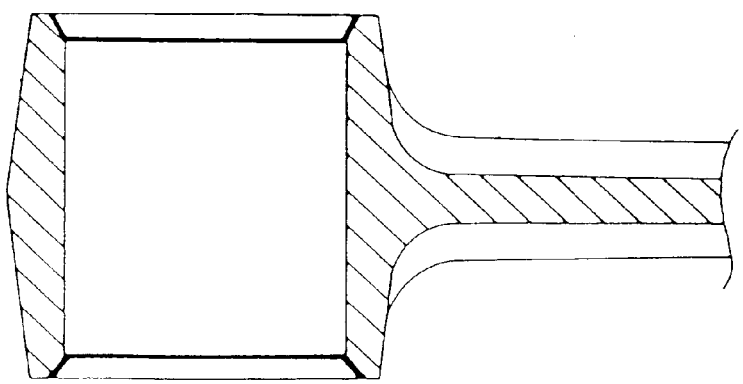
FIG. 3B shows the second step in conventional processing of a connecting rod, wherein the chamfering is carried out.
Figure 4:
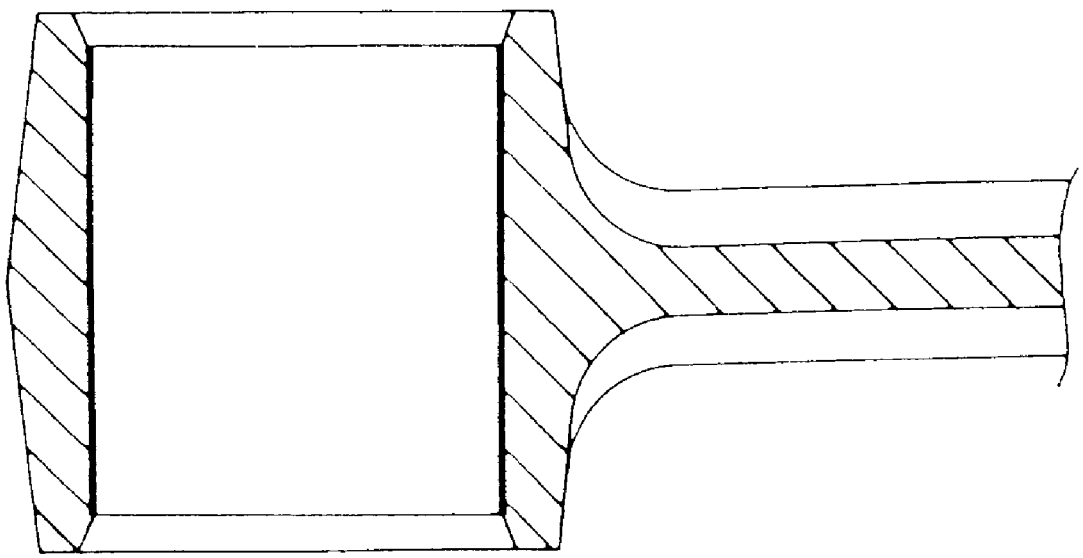
FIG. 4 shows a third step in conventional processing of a connecting rod.
Figure 5:
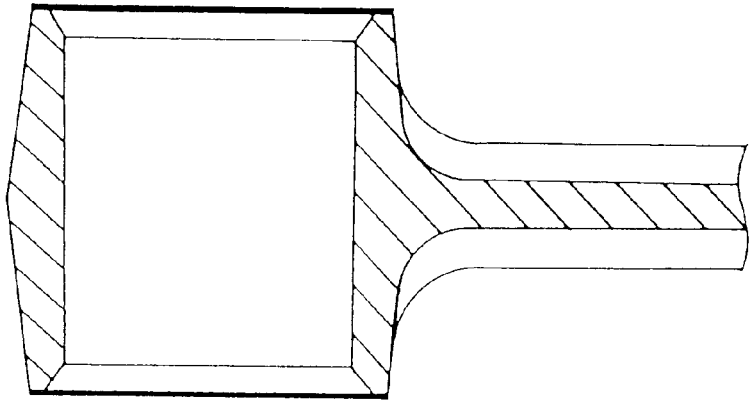
FIG. 5 shows a fourth step in conventional processing of a connecting rod.
Figure 6:
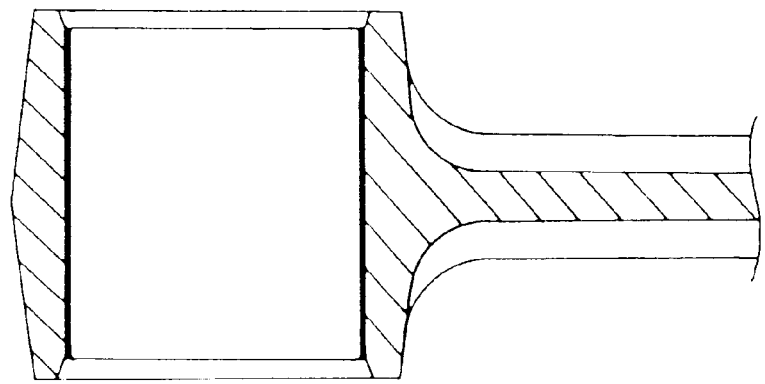
FIG. 6 shows a fifth step in conventional processing of a connecting rod.
Figure 7A:
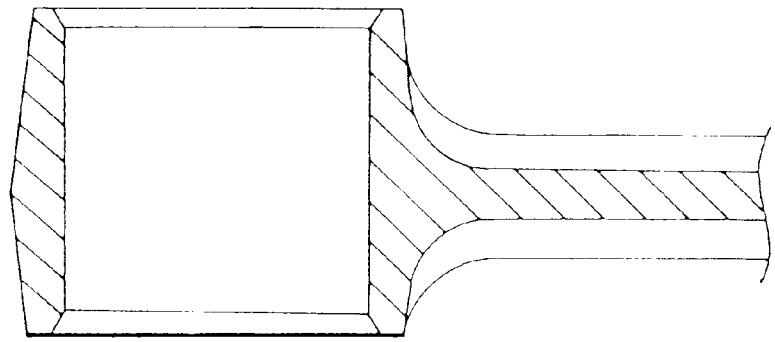
FIG. 7A shows a processing step of one side of the small end of a connecting rod subsequent to the step of FIG. 6.
Figure 7B:
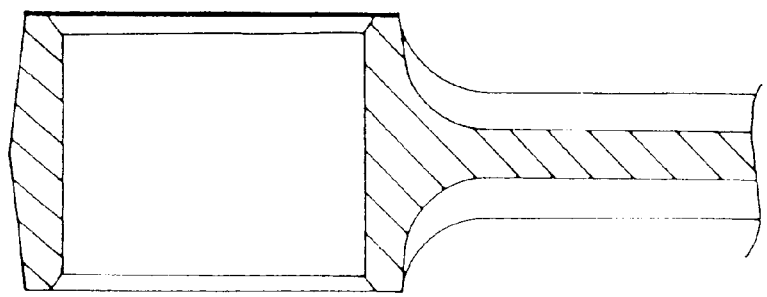
FIG. 7B shows a processing step of another side of the small end of a connecting rod subsequent to the step of FIG. 6.
Figure 8:
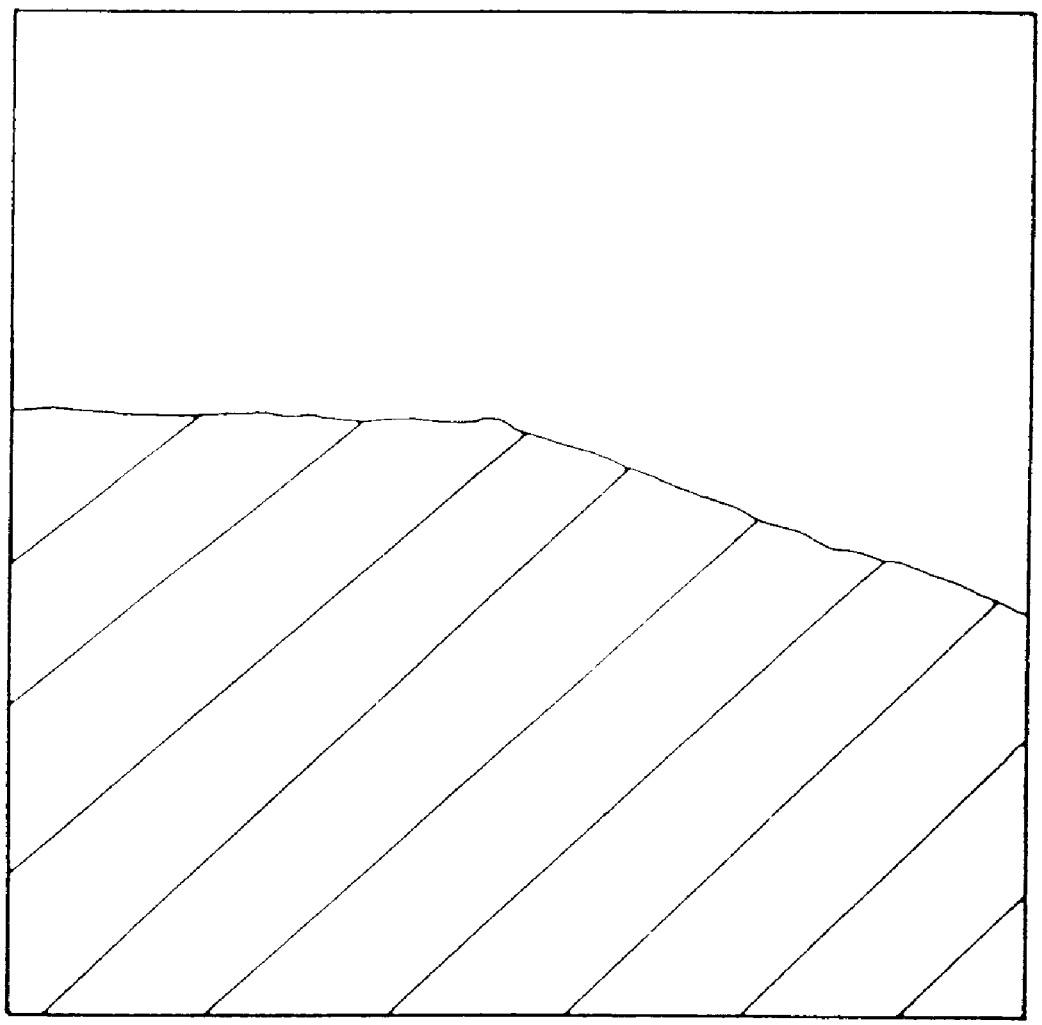
FIG. 8 shows burs generated during the step illustrated in FIG. 5.

FIG. 2 presents a sectional view of the connecting rod of FIG. 1 taken on section line 2—2. The small hole end 32 has a thickness $B_1$, and the large hole end has a thickness $B_2$. The small and large diameter holes (36 and 42) must fall within certain specified tolerances which one determines in reference to a point, a line, and a plane. For example, the small diameter hole 36 and large diameter hole 42 satisfy the desired position and tolerance if deviations from the optimum values for a parallel degree, a pitch and a roundness fall within the ranges 0.05/100 (mm/mm), ±0.05 (mm) and 0.005 (mm) respectively.

Figure 9A:
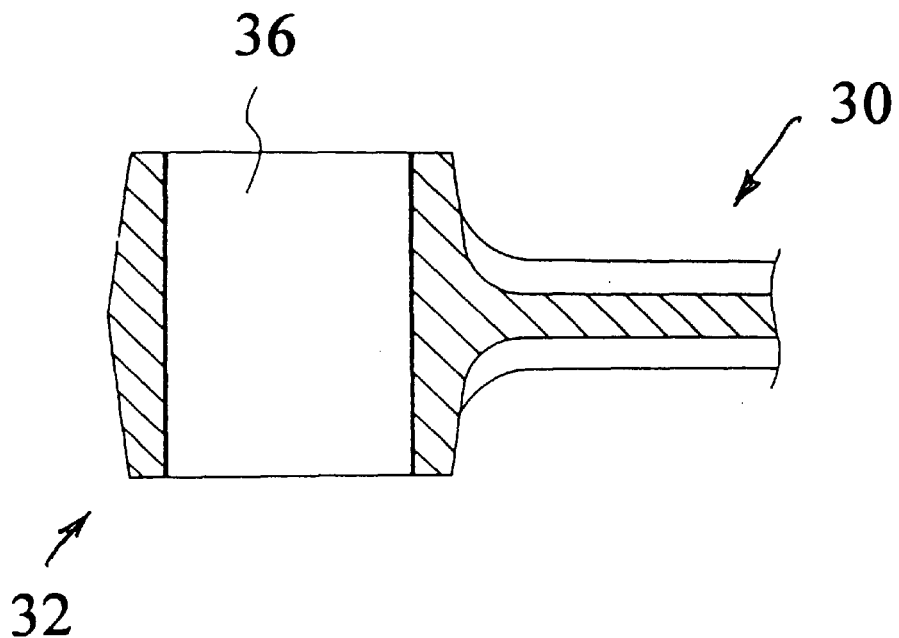
FIG. 9A shows a first step for making a connecting rod as a milling process of the small diameter hole in the preferred embodiment of the present invention.
Figure 9B:
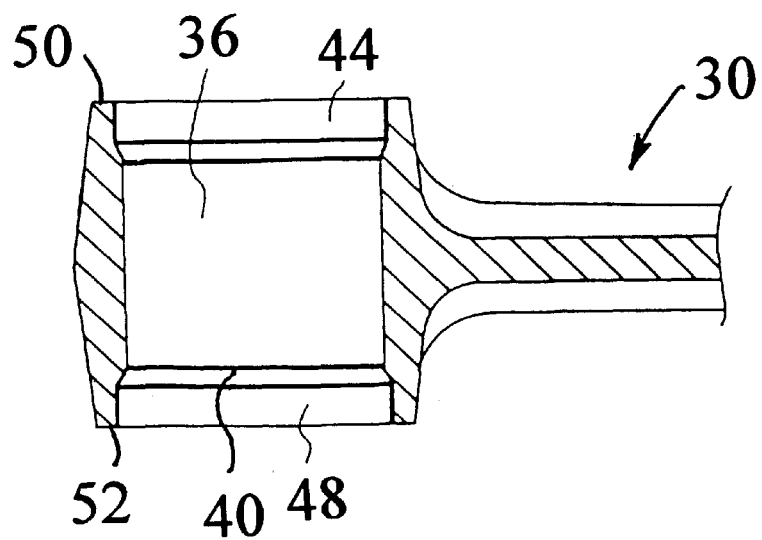
FIG. 9B shows a second milling step according to the preferred embodiment of the invention in which thin edge regions and tapered faces are formed.

The bold lines in FIG. 9A indicate a processing step according to a preferred embodiment of the instant invention. According to this embodiment of the invention, one mills the inner surface 36 as the first manufacturing step on the rough connecting rod 30. One then performs a second milling step with the special milling tool 50 illustrated in FIGS. 10 and 11 to produce a multifaceted inner surface, which is indicated as bold lines in FIG. 9B. The multifaceted inner surface according to the preferred embodiment has an inner surface region 36, deep spot regions 44 and 48, tapered faces 38 and 40, and thin edge regions 50 and 52.

Figure 10:
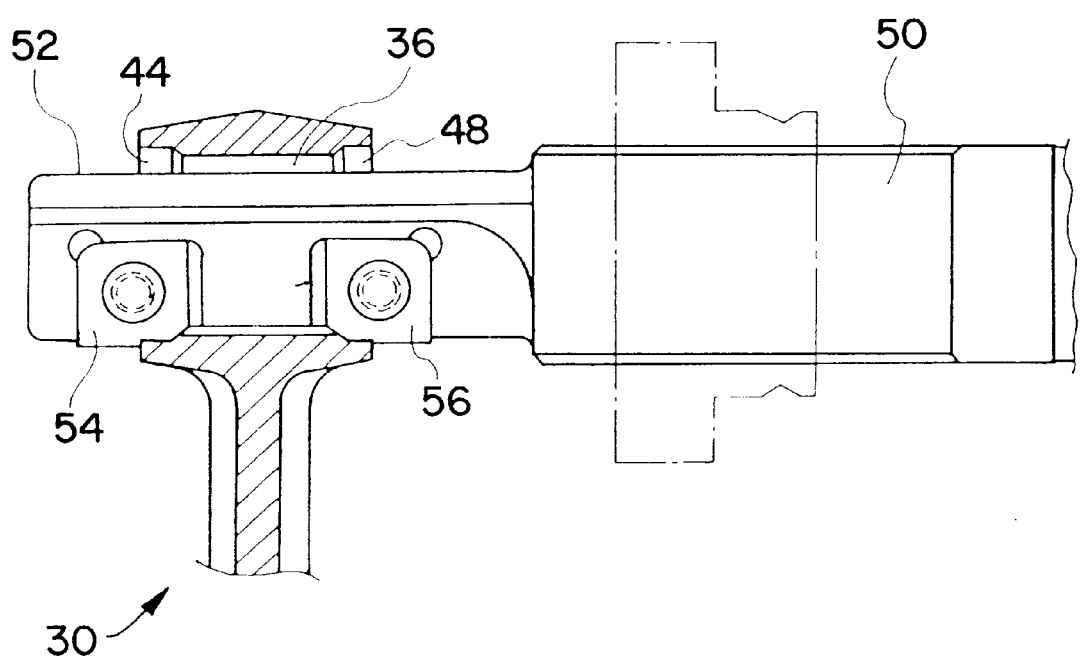
FIG. 10 shows a side view of a tool used for milling the connecting rod as in the step of FIGS. 9A and 9B.
Figure 11:
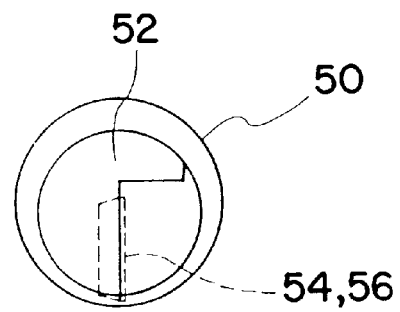
FIG. 11 shows a front view of the milling tool shown in FIG. 10.
Figure 12:
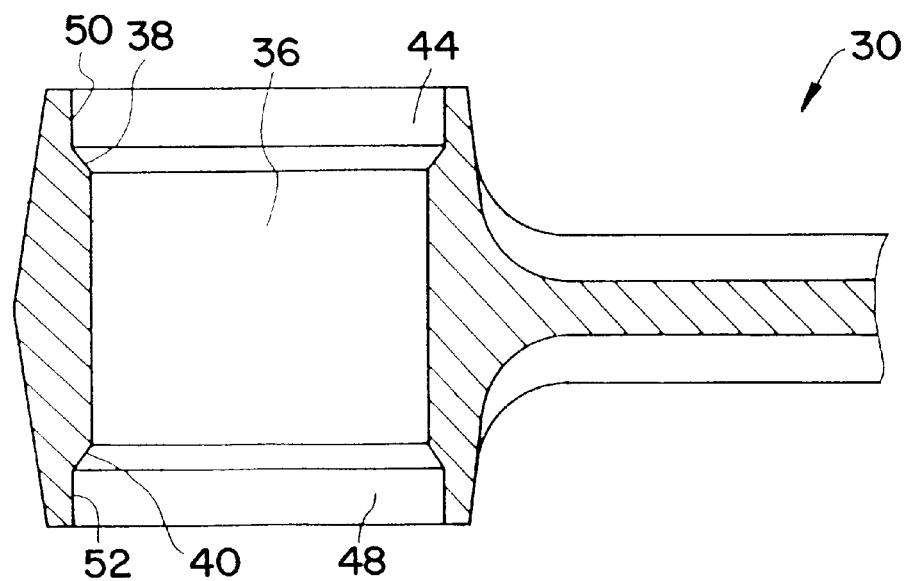
FIG. 12 shows a sectional view where a mechanical processing as a first step is applied to the small diameter hole of the connecting rod shown in FIGS. 9A and 9B.

As one can see illustrated in FIGS. 10 and 11, the special milling tool 50 has a tip end 52 which is eccentric with respect to the axis of rotation. The milling tool 50 has stepped blade portions 54 and 56. When one inserts the milling tool 50 into the small hole defined by the small-hole end of the connecting rod 32, one moves the head of the rotation shaft (not shown) that supports the milling tool 50 in a manner such that the axis of the tip end 52 and the axis of the small hole coincide. This procedure allows one to avoid contact of the stepped blades 54 and 56 with the edge of the small hole prior to milling. One moves the tip end 52 so that stepped blades 54 and 56 make contact with the inner wall of the small hole to form the deep spot faces 44 and 48, and the tapered edges 38 and 40 during this milling step. Consequently, this step also yields thin edges 50 and 52 (see FIG. 12).

Figure 13:
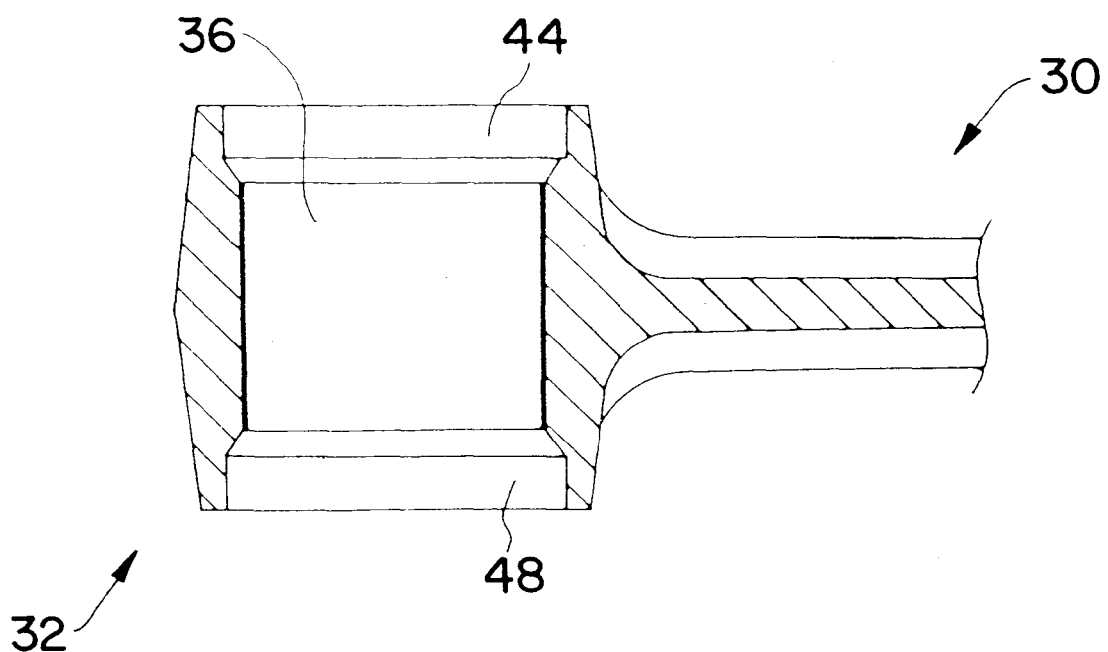
FIG. 13 shows a step for making a connecting rod in the embodiment of the present invention subsequent to the step of FIG. 12.

In the preferred embodiment, one mills the inner surface region 36 a second time to remove any burs on the inner wall from the preceding step, and to ensure that one can use the small hole defined by the small hole end 32 for a process reference hole (see FIG. 13).

Figure 14:
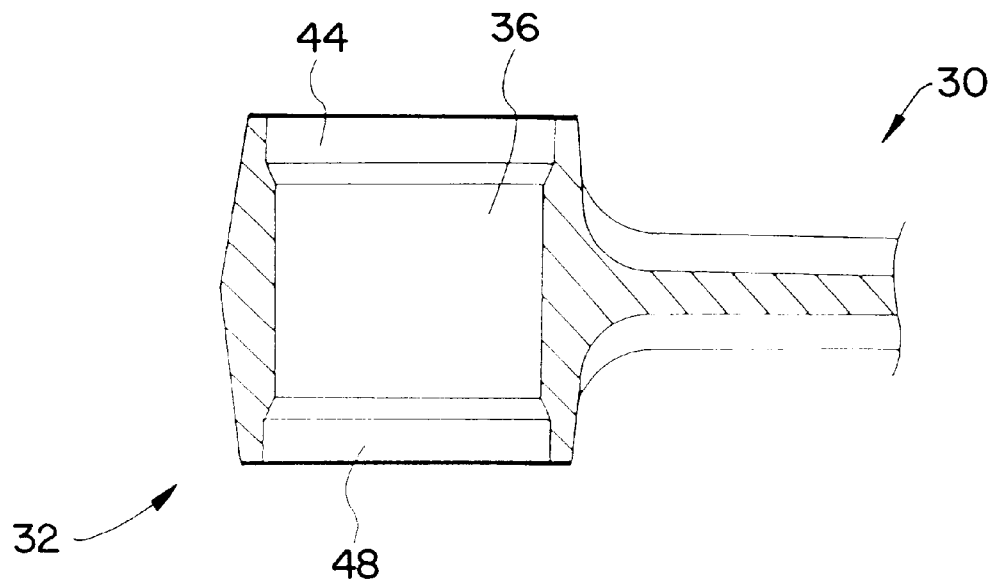
FIG. 14 shows a step for making a connecting rod in the embodiment of the present invention subsequent to the step of FIG. 13.
Figure 15:
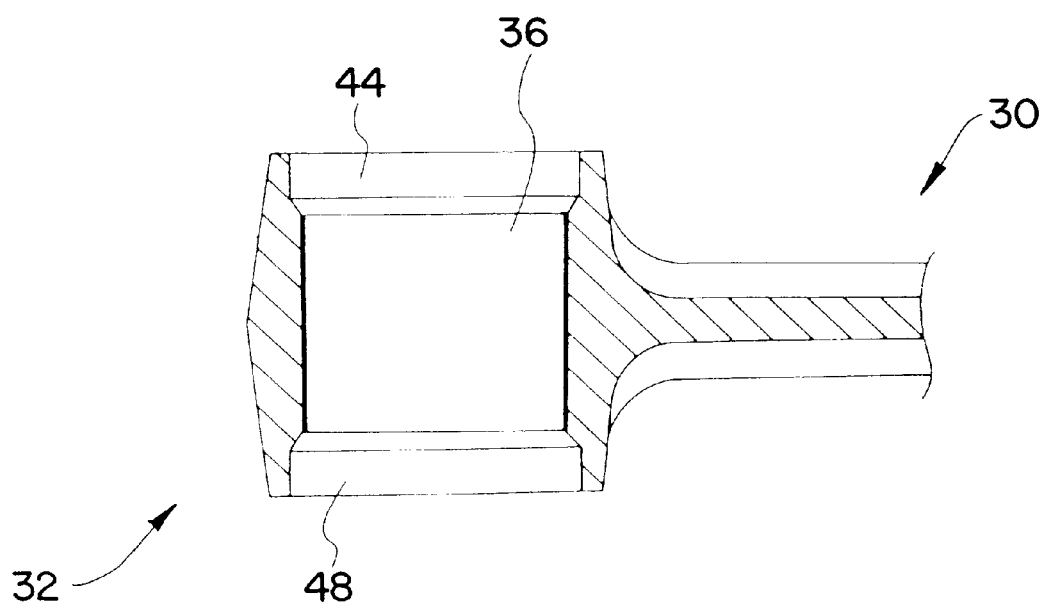
FIG. 15 shows a step for making a connecting rod in the embodiment of the present invention subsequent to the step of FIG. 14.

In the next step, one cuts the small hole end 32 to form substantially parallel planes which are indicated as bold lines in FIG. 14. The parallel planes illustrated are cut such that each plane coincides with a corresponding plane at the large hole end 34, thus providing process reference planes. FIG. 15 indicates that the small hole surface 36 is then used as a process reference hole based on correct positioning and the processing reference planes to simultaneously process the small hole surface 36 and the large hole surface 42 (see FIG. 1) to the desired positions and tolerances.

Figure 16A:
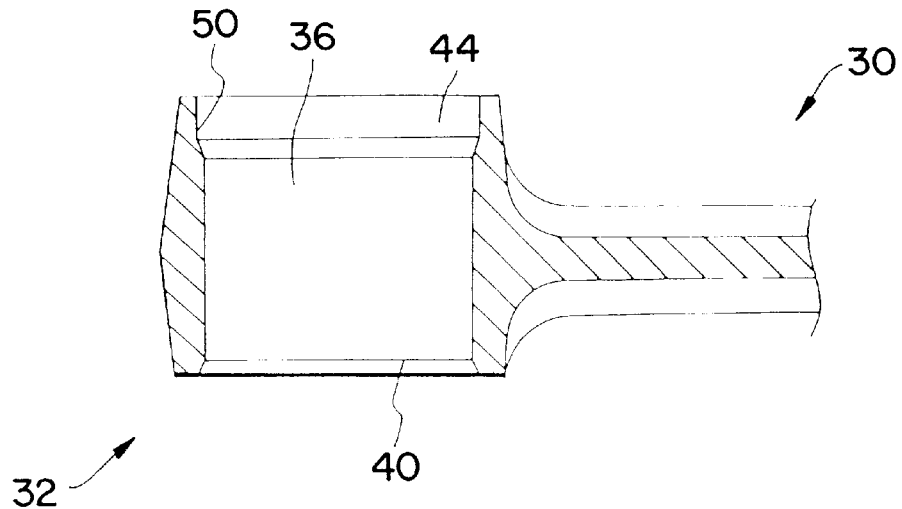
FIG. 16A shows a final step for making a connecting rod in the embodiment of the present invention in cutting one thin edge.
Figure 16B:
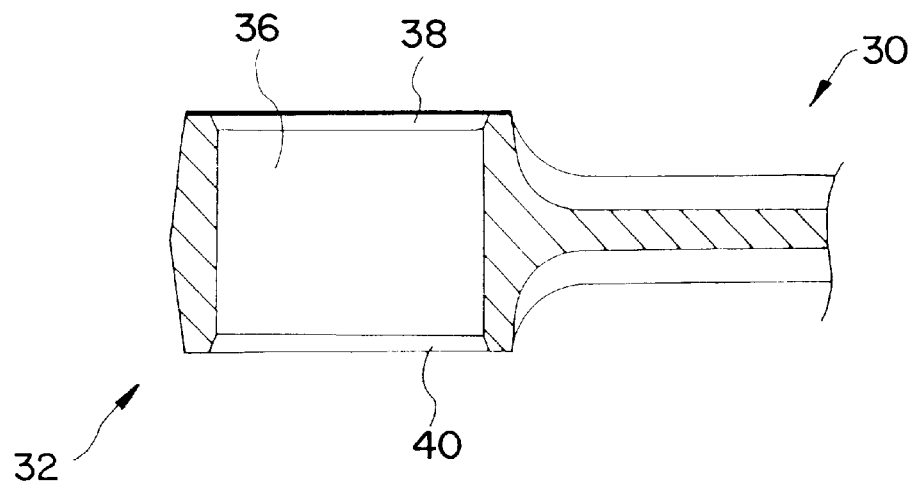
FIG. 16B shows a final step for making a connecting rod in the embodiment of the present invention in cutting the second thin edge.
Figure 17:
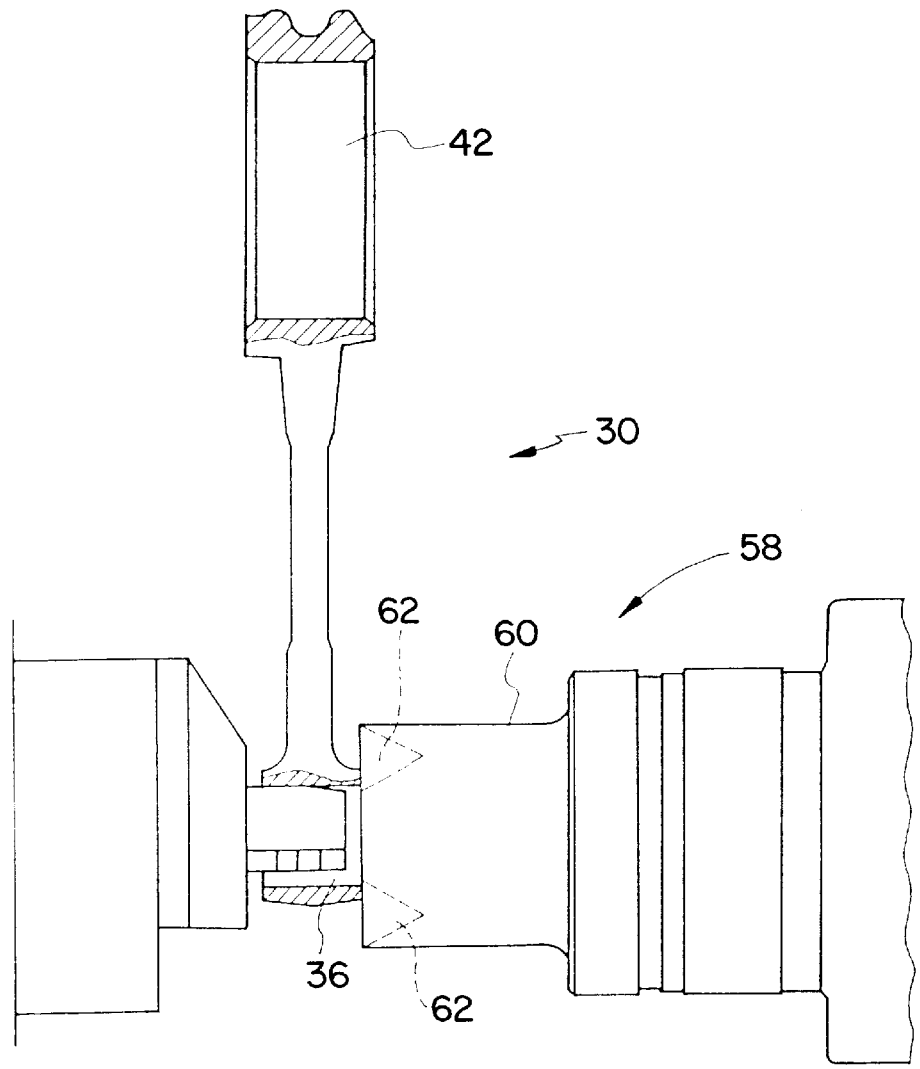
FIG. 17 shows a side of a cutting tool used in the final process in the method for making a connecting rod shown in FIGS. 16A and 16B.
Figure 18:
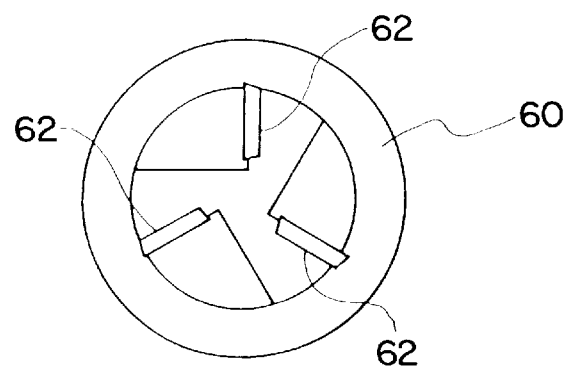
FIG. 18 is a front view of the cutting tool shown in FIG. 17.

FIGS. 16A and 16B illustrate the final step of cutting away the thin edge regions 50 and 52 (FIG. 12) such that the tapered faces 44 and 48 become exposed to serve as chamfered edges. FIGS. 17 and 18 illustrate the rotating cutting tool 58 for cutting away the thin edge regions 50 and 52. The cutting tool tip 60 has blades 62. The rotating action of the cutting tool tip 60 shaves away material with little or no transverse action thus avoiding any significant generation of burs.

The manufacturing method according to this invention thus naturally results in a connecting rod that has a small hole end that is thinner than the large hole end, and has a chamfered-like edge, but without the problem of burs which occurs if one chamfers the edge as the final step. Furthermore, the thin edge regions allows one to process the connecting rod 30 as if the thickness of the small hole end, $B_1$, is equal to the thickness of the large hole end, $B_2$, until the final step of the procedure. Therefore, one can use the small hole end 32 for a process reference hole and process referencing planes, while maintaining a steady production flow for connecting rods which can have various values for $B_1$ for a given $B_2$. The ability to intermingle connecting rods with different values for $B_1$ for a given $B_2$ in the same production line has an advantage of reducing production costs.

Figure 19A:
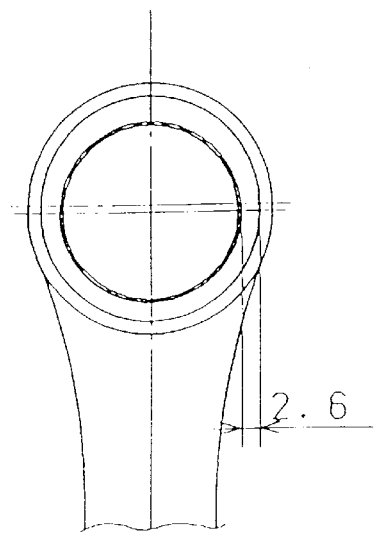
FIG. 19A shows a front view of a small end of a conventional connecting rod.
Figure 19B:
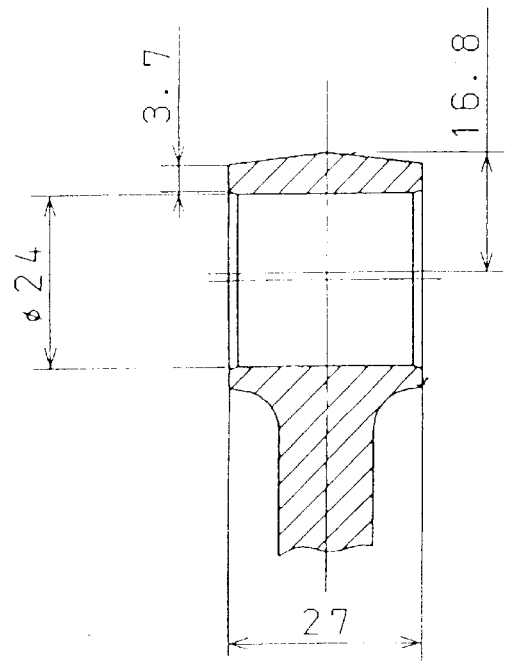
FIG. 19B shows a side view of a small end of a conventional connecting rod.

In addition, the method of manufacturing connecting rods according to this invention permits one to produce connecting rods that are thinner than those produced according to prior art methods. This point is illustrated by contrasting the dimensions of a connecting rod which can be produced by prior art methods, FIGS. 19A and 19B, to a connecting rod that can be produced according to the methods of this invention, FIGS. 20A and 20B, respectively.

Figure 20A:
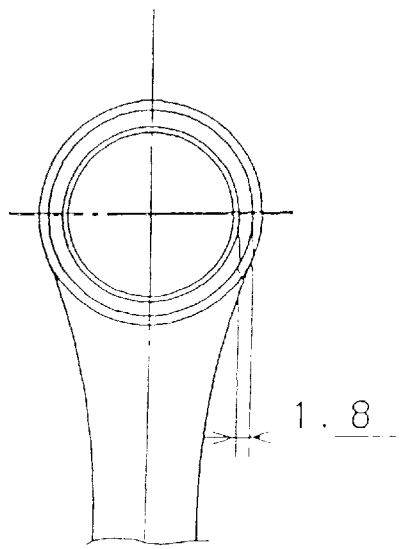
FIG. 20A shows a front view of the small end of a connecting rod according to the embodiment of the present invention.
Figure 20B:
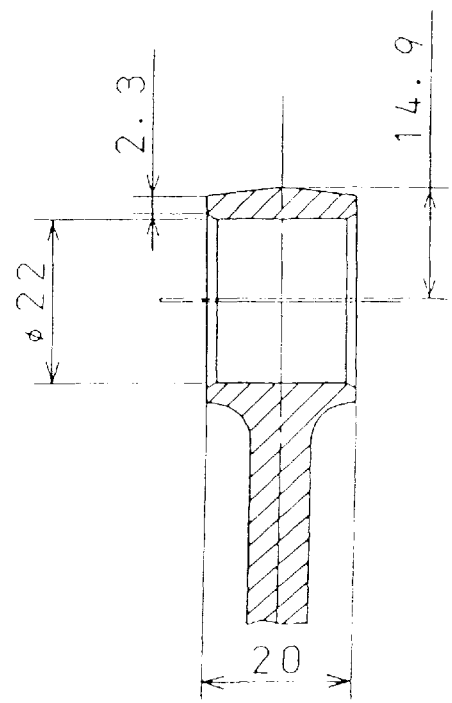
FIG. 20B shows a side view of the small end of a connecting rod according to the embodiment of the present invention.
Figure 21:
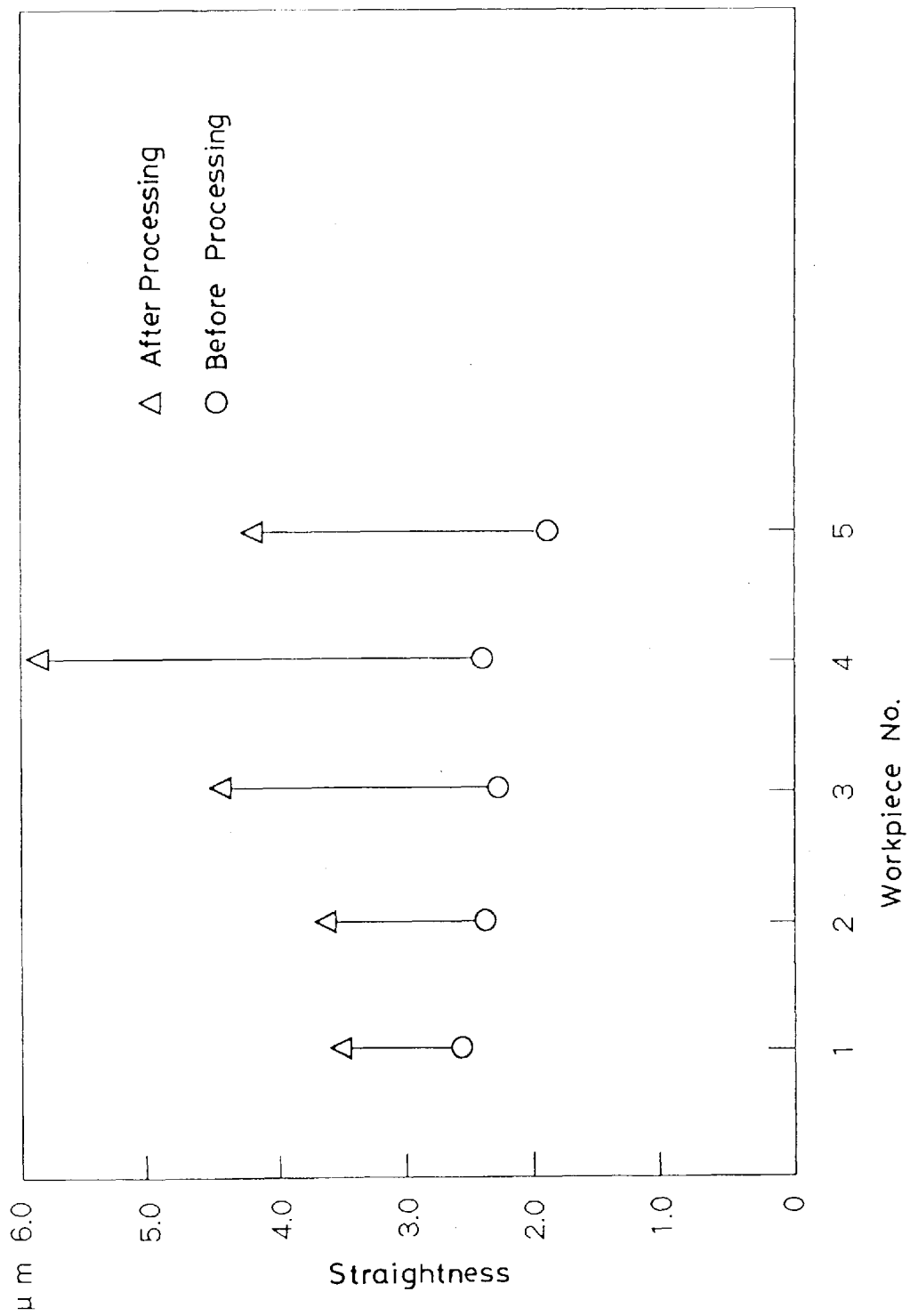
FIG. 21 shows, in a conventional processing method, a variation of the straightness of the small diameter hole in pre- and post shrinkage of the width of the small end.
Figure 22:
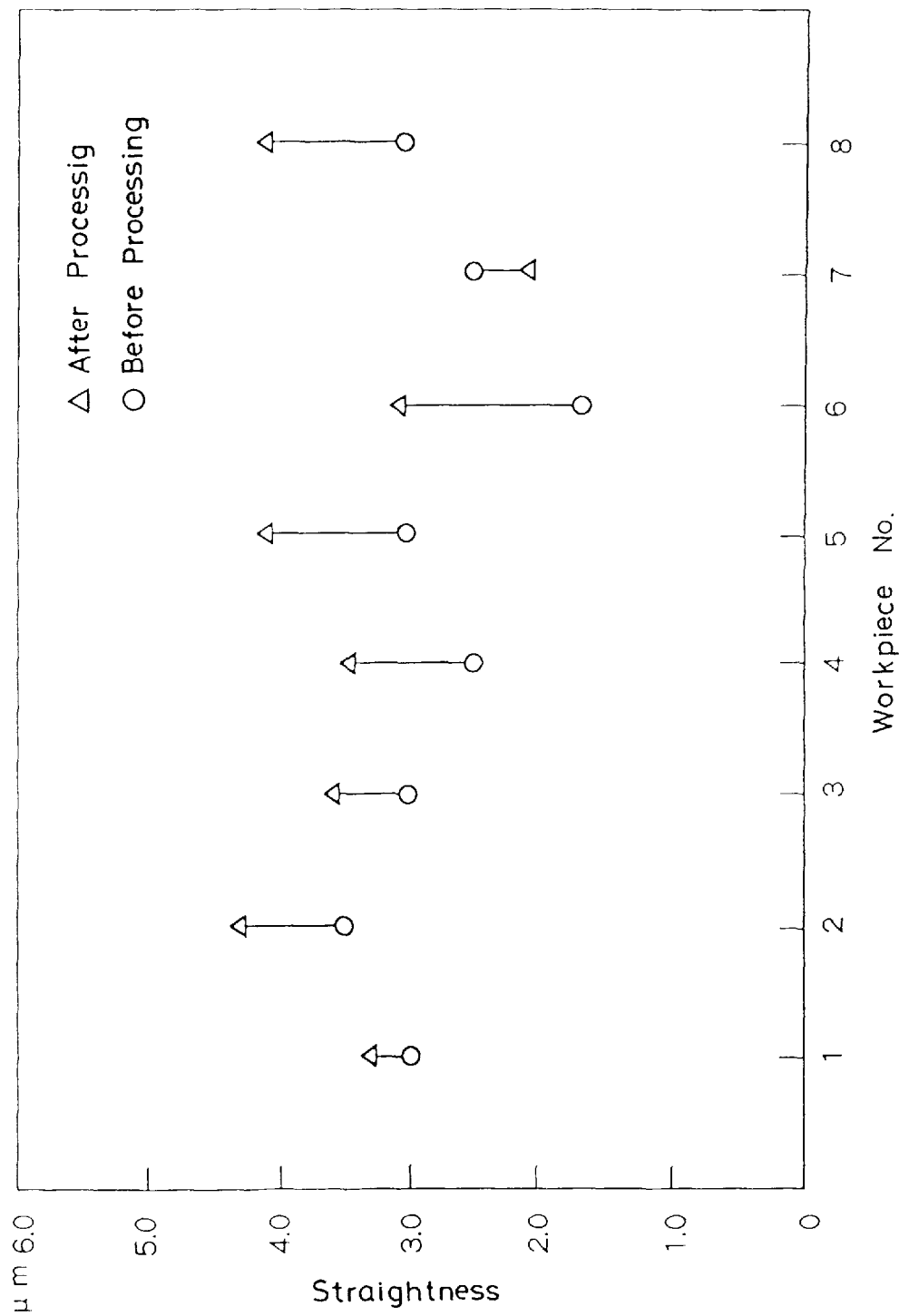
FIG. 22 shows, in a present invention, a variation of the straightness of the small diameter hole in pre- and post shrinkage of the width of the small end.

If prior art methods are used to produce connecting rods of the dimensions indicated in FIGS. 20A and 20B, the final cutting and chamfering steps would produce unacceptable distortions to the connecting rod due to the thinness of the material. This point is illustrated with empirical data in FIGS. 21 and 22. FIG. 21 shows measured values for straightness for five workpieces (connecting rods) both before and after processing according to a prior art method. When contrasted with the corresponding measurements for eight workpieces produced according to the instant invention in FIG. 22, one can see that the final processing according to prior at methods leads to significant degradation in straightness. The ability to produce connecting rods 30 which are thin at the small hole end 32 leads to weight-saving advantages and increased flexibility in engine design.

Although the invention has been described with reference to a specific embodiment, this embodiment is illustrative of the principles of the invention. One should recognize that there are modifications and rearrangements of the above-illustrated embodiment which one may devise without departing from the spirit and scope of the invention.

What is claimed is:

1. A method of manufacturing a connecting rod for a piston engine comprising the steps of:

forming a rough structure such that said connecting rod defines a small hole at an end and a large hole at an opposing end;

as a step prior to a final step, milling material that defines an inner surface of said small hole to form a multifaceted inner surface;

as a final step cutting the small end of a given width.

2. A method of manufacturing a connecting rod for a piston engine according to claim 1, wherein said step of milling said material that defines said inner surface of said small hole further defines a first thin edge region at an edge of said small hole.

3. A method of manufacturing a connecting rod for a piston engine according to claim 2, wherein said step of milling said material that defines said inner surface of said small hole further defines a first tapered face between said first thin edge region and a central region of said inner surface.

4. A method of manufacturing a connecting rod for a piston engine according to claim 3, wherein said step of milling said material that defines said inner surface of said small hole further defines a second thin edge region at an opposing edge of said small hole relative to said first thin edge.

5. A method of manufacturing a connecting rod for a piston engine according to claim 4, wherein said step of milling said material that defines said inner surface of said small hole further defines a second tapered face between said second thin edge region and said central region of said inner surface.

6. A method of manufacturing a connecting rod for a piston engine according to claim 5, further comprising the step prior to said final step of machining said small hole end of said connecting rod such that said small hole end defines two substantially parallel process reference planes spaced apart in an axial direction of said small hole such that said reference planes are substantially perpendicular to said small hole axis.

7. A method of manufacturing a connecting rod for a piston engine according to claim 6 further comprising the step prior to said final step of processing said large hole end wherein said small hole serves as a processing reference hole and said reference planes serve as processing reference planes.

8. A method of manufacturing a connecting rod for a piston engine according to claim 7 further comprising a penultimate step of removing said first thin edge region with a rotating cutting tool, thus allowing said first tapered face to serve as a first chamfered surface.

9. A method of manufacturing a connecting rod for a piston engine according to claim 8, wherein the final step includes the step of removing said second thin edge region with a rotating cutting tool, thus allowing said second tapered face to serve as a second chamfered surface.

10. A method of manufacturing a connecting rod for a piston engine according to claim 1, further comprising the step prior to said final step of milling said material that defines said inner surface of said small hole such that said inner surface is substantially cylindrical prior to said milling step that forms a multifaceted inner surface.

11. A method of manufacturing a connecting rod for a piston engine according to claim 5, further comprising the step of milling said central region of said inner surface such that substantially all burs produced in the preceding steps are removed.

12. A connecting rod for a piston engine manufactured according to steps comprising:

forming the rough structure of said connecting rod such that said connecting rod defines a small hole at an end and a large hole at an opposing end;

milling material that defines an inner surface of said small hole such that said small hole has first and second thin edge regions, wherein an inner surface of said small hole has a first tapered face between said first thin edge and a central surface region of said inner surface, and a second tapered surface between said second thin edge and said central surface region of said inner surface; and a final step of removing said first and second thin edges with a rotating cutting tool.

\* \* \* \* \*